United States Patent

Dietrich

[15] 3,652,991

[45] Mar. 28, 1972

[54] ARRANGEMENT FOR CHARACTER RECOGNITION OF CHARACTERS WHICH ARE BROKEN UP INTO CHARACTERISTIC SHAPE ELEMENTS

[72] Inventor: Walter Dietrich, Pforzheim, Germany

[73] Assignee: International Standard Electric Corporation, New York, N.Y.

[22] Filed: Aug. 17, 1970

[21] Appl. No.: 64,217

[30] Foreign Application Priority Data

Aug. 29, 1969 Germany ......................P 19 44 073.4

[52] U.S. Cl. ......................................................340/146.3 J

[51] Int. Cl. ......................................................G06k 9/13

[58] Field of Search ..............................................340/146.3

[56] References Cited

UNITED STATES PATENTS

| | | | |
|---|---|---|---|
| 3,178,688 | 4/1965 | Hill et al. | 340/146.3 AC |
| 3,496,541 | 2/1970 | Haxby et al. | 340/146.3 J |
| 3,382,482 | 5/1968 | Greenly | 340/146.3 AC |
| 3,202,965 | 8/1965 | Nadler | 340/146.3 AC |
| 3,178,687 | 4/1965 | Perotto | 340/146.3 AC |
| 3,541,511 | 11/1970 | Geuchi et al. | 340/146.3 AC |

*Primary Examiner*—Maynard R. Wilbur
*Assistant Examiner*—William W. Cochran
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

The present invention relates to automatic character recognition, in which the characters are broken up into their characteristic shape elements, and in which the scanned and electrically stored shape elements are detected by probes corresponding to the shape elements. The shape elements are successively fed to the probes, and the probe most similar to the particular shape element, is detected by a first extreme value detecting circuit. The detected probe is assigned to the relevant character on the basis of its location in the character area, and the number of probes for each character is stored, so that the character with the largest number of assigned shape elements is determined and recognized by a second extreme value detecting circuit.

15 Claims, 19 Drawing Figures

PATENTED MAR 28 1972 3,652,991

SHEET 01 OF 10

INVENTOR

WALTER DIETRICH

BY Menotti J. Lombardi

ATTORNEY

INVENTOR
WALTER DIETRICH
BY [signature]
ATTORNEY

INVENTOR

WALTER DIETRICH

BY Menotti J. Lombardi

ATTORNEY

INVENTOR
WALTER DIETRICH
BY [signature]
ATTORNEY

INVENTOR
WALTER DIETRICH

BY [signature]
ATTORNEY

INVENTOR

WALTER DIETRICH

BY [signature]

ATTORNEY

INVENTOR
WALTER DIETRICH
BY Menotti J. Lombardi
ATTORNEY

INVENTOR

WALTER DIETRICH

BY Menotti J. Lombardi

ATTORNEY

INVENTOR
WALTER DIETRICH

BY Marzotti & Lombardi

ATTORNEY

INVENTOR
WALTER DIETRICH
BY Menotti J. Lombardi
ATTORNEY

ARRANGEMENT FOR CHARACTER RECOGNITION OF CHARACTERS WHICH ARE BROKEN UP INTO CHARACTERISTIC SHAPE ELEMENTS

CROSS-REFERENCE TO RELATED APPLICATION

The application is related to copending application Ser. No. 824,752, filed May 9, 1969, and entitled Process and Arrangement for Automatic Character Recognition (W. Dietrich et al., 22–5).

BACKGROUND OF THE INVENTION

A large number of recognition processes are termed analog or digital processes according to their essential function. The best-known analog-type process is used with the magnetic type font E 13 B. In this case the character, printed in magnetic ink, is rapidly drawn past the air gap of a magnetic head. The output of the magnetic head provides a voltage waveform whose amplitude at any given instant corresponds to the variation of the extent of the ink in the direction of the length of the gap, according to the law of induction. Thus the voltage waveform has a characteristic shape for each character, and this is stored in a delay line, from which it is evaluated with the aid of resistance networks characteristic of each character and a delay line. The resistance network associated with the character just scanned provides the greatest output potential, which is picked out from the output potentials of all the resistance networks by means of an extreme value detecting circuit, and the character read is thus converted to an external signal. This process is simple and works well as long as the printing quality is very good. If this is not the case the process makes mistakes, or may even break down altogether due to the amount of information which has to be extracted from a single track by means of an inadequate magnetic head.

In optical character-recognition systems it is desirable and necessary to allow comparatively poor printing qualities, in which case the above-described simple process is no longer adequate. In contrast thereto, a number of parallel tracks is provided, each having light transducing devices for scanning the character, and an equal number of delay lines from which there is tapped a voltage distribution which corresponds to the shape of the character, and the amplitude of the voltages being determined by the density of the character. The voltage distribution is evaluated (character is recognized) by means of one resistance network per character followed by an extreme value detecting circuit, the resistance networks not being one-dimensional in this case but two-dimensional.

A reading process of this kind, which operates throughout with analog values, provides, at a given resolution, the maximum information for the recognition circuits. In the present example, the resistance networks, as derived from this configuration, theoretically allows characters with extremely unfavorable properties to be recognized, when the characters are suitably designed.

A realization of such pure analog-type processes in practice is difficult. In order to achieve the speeds usually obtained in digital data processing, it is necessary to process the scan-data largely in parallel. To obtain a system in which the extreme value detecting circuit can determine the correct character, that is, the highest voltage, with certainty from the other characters and in particular from the next largest, that is, virtually equal voltage, it is necessary for the entire equipment to be largely interference free. Finally, the "centering," a process involving the shift of the electrically stored information to the recognition circuits, has not been satisfactorily established with analog potential values, since it has been necessary to seek a solution in other directions, for example, by multiplication of the recognition circuits.

These factors including the parallel processing of information, the extensive interference suppression requirements, and the centering, are costly and can adversely affect operational reliability, and they are better overcome by the use of suitable digital methods.

The delay lines are replaced by digital shift registers, and the evaluation of the information stored therein is effected, as above, with resistance networks. This has the additional advantage for the following extreme value detecting circuits that the digital voltages are intrinsically free of interference.

The resistance networks are generally in the form of star connections in which one end of the resistor is connected to one point of the two-dimensional store while the other end is common to all resistors and is connected to the input of the extreme value detecting circuit. When the set of characters has a large number of characters, high resolution and a large number of storage points is necessary, and one resistor is required for nearly every storage point such that a large number of resistors is necessary per network, i.e., typically 200 resistors for one network or one character. As the number of different characters increases, the critical voltage for the correct character, the voltage difference between the peak voltage for the correct character and the next largest voltage for the most similar and incorrect character, decreases and the risk of faulty recognition becomes greater.

If it is desired to add a further character to the set of characters and it it is one having an existing meaning but a slightly different shape (such as the closed-top and open-top digit "4"), it is still necessary to provide a further resistance network.

Such a "different character" is also produced when a character is changed in size, even though it retains its meaning and its shape. For example, in the standardization of digits and capital letters for optical character recognition four sizes are provided for each character to make allowances for different kinds of printers. It will be readily understood that in such cases the number of recognition circuits is very large.

SUMMARY OF THE INVENTION

An object of the invention is to avoid these drawbacks and the uncertain determination of the maximum voltage without the complicated extension of the recognition circuit to other characters, particularly similar characters.

Another object of the present invention is to provide further embodiments of the arrangement and process according to the copending application cited as a cross-reference.

According to an embodiment of the invention, the scanned and electrically stored shape elements are subjected to an intermediate storage, and several recognition processes are carried out successively and simultaneously with the recognition process, with the shape elements being restored in unchanged fashion in the intermediate store. During each recognition process different shape elements are offered to the probes, to determine the number of occurrences one shape element is stored, and in dependence upon this number, there is effected a change of contrast of the subsequently following identical shape elements.

According to another embodiment of the invention, the scanned and electrically stored shape elements are subjected to intermediate storage, the store areas for the shape elements and the probe area are greater than the character area, and simultaneous evaluation is carried out in two overlapping probe areas which are the same size as the character areas, such that the number of occurrences of a shape element is stored, and depending on this number, the contrast of the subsequent identical shape elements is changed.

BRIEF DESCRIPTION OF THE DRAWINGS

The invention will best be understood by reference to the following description when taken in connection with the accompanying drawings, in which.

DESCRIPTION OF THE PREFERRED EMBODIMENTS

Figure 1:
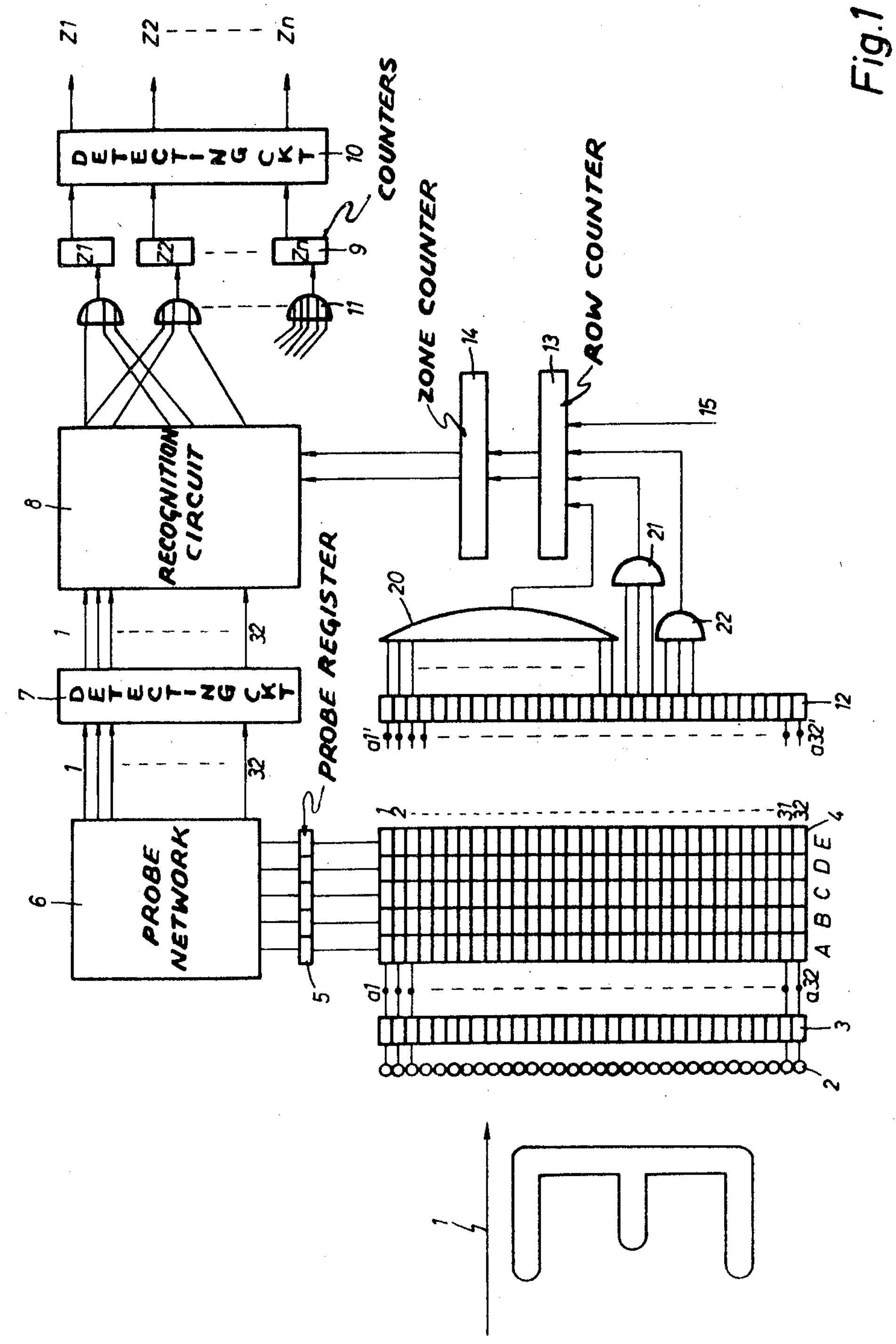
FIG. 1 shows a block diagram according to the copending application.

In the examples to be described hereinafter, the characters of the OCR-A set of characters are scanned on a raster basis by means of a series of optical transducers which scans the character area column by column.

The arrangement according to the cross-referenced application will now be explained in connection with the block diagram shown in FIG. 1. It is assumed that the digit "3" is being scanned and moved across the series of optical transducers 2 in the direction indicated by the arrow 1. In order to be able to compensate for variations in height, changes of size and printing inaccuracies, the series of optical transducers is chosen to be longer than the height of the characters. The signals from the optical transducers are amplified and digitalized in the associated circuits 3, preferably in four gray-value stages. The signals as appearing at the outputs $a_1 \ldots a_{32}$ are stored, column by column, in the two-dimensional shift register 4, and are moved forward therein again column by column. Due to the gray-value stages, the shift register comprises double the storage cells as scanning points are provided.

When the character is stored in its entirety, it is read out line by line perpendicularly to the storing direction. At each shifting pulse, the information of one line of the character is fed, via the probe register 5, to the probe network 6. The probe network is a translator and contains as many columns as the shift register 4, and as many rows as are necessary for reliable recognition of the characters, in the present example not more than 32.

At each shifting pulse, one of the probes, namely the one most similar to the part, i.e., row of the character stored in the probe register, delivers the maximum signal. This is detected by the extreme value detecting circuit 7 and passed on to the recognition circuit 8. In the recognition circuit 8, there is effected an assignment of the detected probe to all those characters which have the shape characterized by the said probe in the row under consideration. However, there will only be one character to which all of the statements of the extreme value detecting circuit 7 will apply, that is, the character being scanned, while in the case of all the other characters only some of the signals will apply. Accordingly, the correct character is detected in the course of a second recognition step. To accomplish this, the binary counters 9 for the characters *Zl* to *Zn*, as well as the extreme value detecting circuit 10 are provided. Each of the counters *Zl* to *Zn* is allocated to a character included in the set of characters. The recognition signals of the recognition circuit 8, in which there is also effected a row-by-row or line-for-line assignment of the probes, are fed, via the OR-circuits 11, as counting pulses to those counters whose associated characters has the feature exhibited by the probe. Thus, that counter (*Zl* to *Zn*) will indicate the highest total which is associated with the character which has been scanned, and the final step is to detect this counter in the extreme value detecting circuit 10 is provided. The height register 12 together with the AND-circuits 20, 21, 22 detects the size of character. The row counter 13 and the zone counter 14 combine several rows to form one zone. The shifting and counting clock pulses are controlled by the common clock pulse generator 15.

Further details of the arrangement according to the referenced application are described in the specification of said application and, as far as is necessary for enabling a better understanding of the present invention, will be referred to in the course of this specification.

In a first arrangement according to the invention, the reading speed is increased and adapts the recognition process to characters which are of poor print or which are not exactly stored. This arrangement employs the recognition process several times under changed conditions in the case of non-recognized characters, and controls the described digital gray-value stages in dependence upon the density or blackness of the printed character.

For reasons of economy, optical character recognition systems require speeds in the order of 3,000 characters per second. When the arrangement according to FIG. 1 is used, it may be estimated that for the part which is most critical with respect to frequency, i.e., the extreme value detecting circuit 7, only fractions of 1 $\mu s$ are available per evaluation of one row. This number includes the time required for releasing the circuit, for setting the analog input signals at the extreme value detecting circuit, and for effecting interrogation. These requirements are so high as to cause an inaccurate setting of the input signals and, therefore, a reduced reading reliability. A further reason for the short time is that between two neighboring characters, in unfavorable cases, there only exists a space of about 0.25 millimeters, which would correspond to a reading time of 50 $\mu s$. During this time, the character must be passed completely out of the shift register and through the probe register. In the case of a reading zone corresponding to the height of three characters, and in the case of the assumed resolution, the shifting pulse will amount to several M/c. In the case of a purely digital shift register this frequency is possible, but difficulties may arise in cases where analog signals are being processed.

Figure 2:
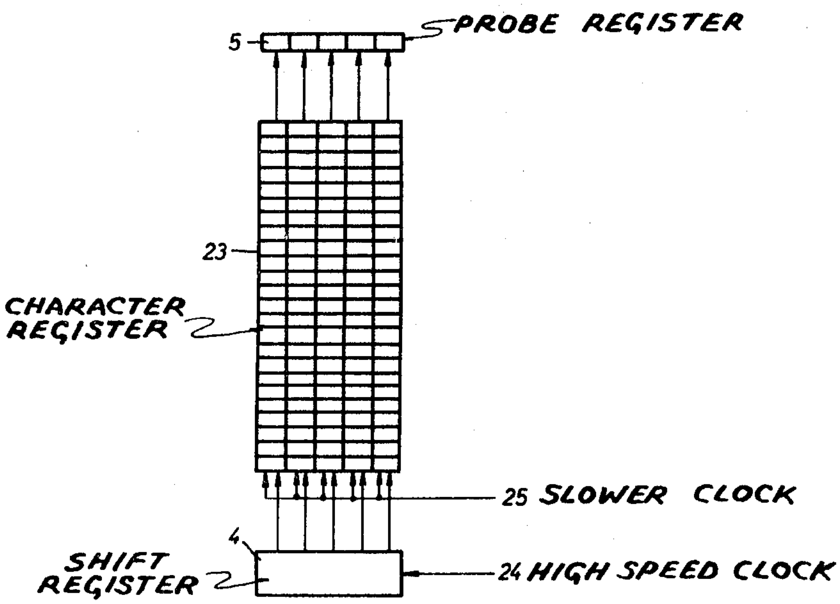
FIG. 2 shows an embodiment according to FIG. 1 using a character register.

In FIG. 2 there is now shown one feature of the first arrangement, namely that of the intermediate storage to increase the reading speed. Between the shift register 4 and the probe register 5 there is inserted a character register 23 which is designed as a shift register and is capable of storing the largest character. Accordingly, in the example it contains 24 rows. The character is shifted into the character register with a rapid pulse 24. The character register is thereupon separated from the shift register, and the character is forwarded with a slower pulse 25 from the character register 23 to the probe register 5. For transmission there is available a period of about 250$\mu s$, during this time the next character is inserted in shift register 4. In cases where the character register consists of 24 rows, a time of about 10 $\mu s$ is available for each individual evaluation in the extreme value detecting circuit 7, hence a period which is much longer than without the character register.

In so doing, and for determining the character height, each time one flip-flop must be inserted between the three AND-circuits 20, 21 and 22, and the row counter 13, for retaining the data concerning the character height, whereas the next character is already being stored in the shift register, and the height register is being set anew.

According to a second feature of the first arrangement, several recognition processes are carried out successively, and simultaneously with one recognition process, all shape elements of the character are restored in the character register. In the case of each further recognition process, different shape elements will then be offered to the probes.

A third feature of the first arrangement, the change of contrast, will be described hereinafter in conjunction with FIG. 11.

There is a first further embodiment of the first arrangement, according to which shape elements from an intermediate storage range which is staggered with respect to the first recognition process, are offered to the probes in the course of the second recognition process.

When subdividing both the shift and the character register into five columns, one of these columns will correspond to one fifth of a standardized character width in the case of nominal dimensions, or to 0.35 mm. Since, except for the width of striae or dash, there is a total tolerance of 0.30 mm., and since the faulty points and ink spots in the character pattern must be considered, it will be easily recognized that the entire black information of one character may vary by the width of one column. In cases where the two registers with their five columns are designed for characters printed from weak to normal, a strongly or solidly printed character will have a width of about six columns, with it not being known whether the part of the character extending over five columns and containing the information which is important for the recognition, is positioned in the columns 1 to 5 or in the columns 2 to 6.

Since both the density or blackness and the width of striae of the characters in the case of different printing methods are no longer in any direct relationship, it cannot be detected before or during the storing process, whether the character in the register is in the proper horizontal position.

Figures 3, 4:
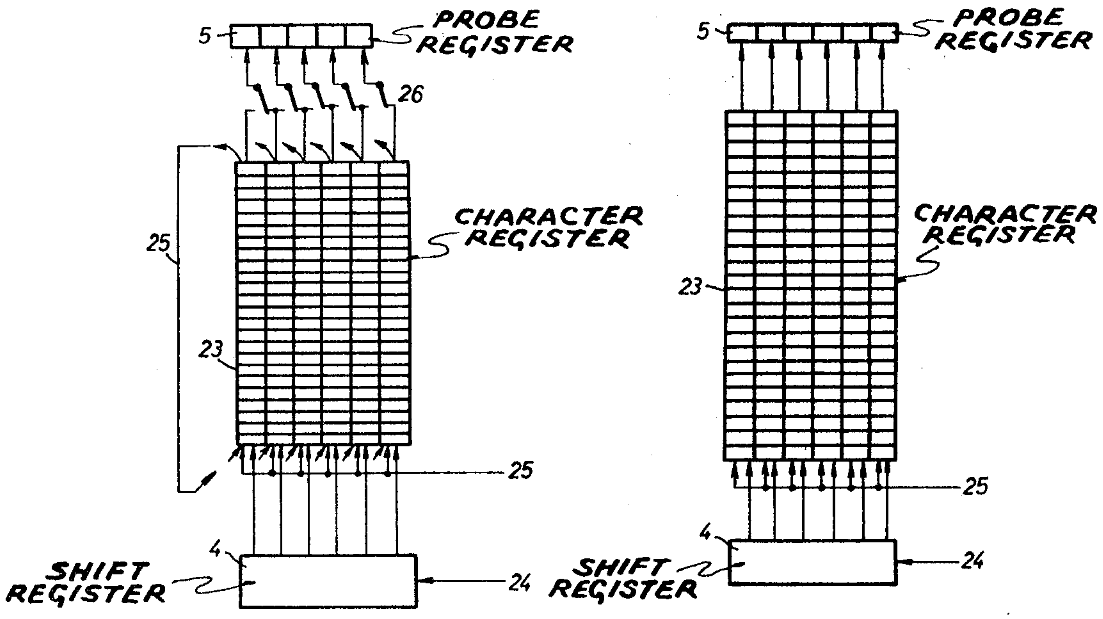
FIG. 3 shows a character register for staggered re-storing.
FIG. 4 shows a character register for a parallel evaluation in two character areas overlapping each other.

It is an advantage, as shown in FIG. 3, to enlarge the shift register 4 and the character register 23 by one column, to a total of six columns. The character is shifted from the character register through the probe register, and simultaneously past the latter and below again into the character register. In the numerical example, the character, after 24 pulses of the pulse 25, is again stored in the same position within the character register 23. If during this evaluation there has been obtained a non-recognized signal or a multiple-recognized signal (both signals can be obtained from the outputs *Zl* to *Zn* in FIG. 1 by a logical circuit), then the recognition process is repeated under changed conditions. The probe register 5 which, during the first recognition process, was connected to the columns 1 to 5 of the character register 23, and with the aid of switch 26 which can be reversed by the non-or multiple-recognized signal, is now connected to the columns 2 to 6. The frequency of the pulse 25, in this process, must be increased by about a factor 2 in order to terminate the double recognition process as soon as the next character is stored in the shift register.

In a second further embodiment of the first arrangement, in the course of a second recognition process and any probable further recognition processes, shape elements are offered to the probes which, with respect to the shape elements of the first recognition process, are electrically modified. This second further embodiment may be applied either alone or in combination with the first further embodiment.

In the case of characters of poor print, recognition is often rendered difficult because of the degrees of blackness or density of the characters themselves, and because of poor character contours. When designing the recognition circuits to recognize characters of poor print, they have problems in recognizing characters of heavy print, and vice versa. However, when designing the recognition circuits to be suitable for recognizing characters of poor as well as of heavy print, the reliability suffers because too much information must be admitted as being "random," such as white or black. Spots are likely to appear in the surroundings of the character, which may have been caused by the printing ink or by other soiling.

These errors can be overcome by making use of three favorable electrical changes of information as described hereinafter.

In the first two of these possibilities the blackness or density is changed such that the electrical information is converted as if the character were either printed weaker or stronger than is actually the case, in dependence upon whether a selectable portion of the character register comprises a great amount of "black" or "light-gray" information.

By means of a third possibility, it is possible to remove spots which are not related to the character contour.

The three possibilities for converting the character information are as follows:

1. "Brightening" -- In cases where a character in at least three of four neighboring rows comprises more black (*s*) than dark-gray (*dgr*), and simultaneously more dark-gray (*dgr*) than light-gray (*hgr*) points, as measured independently in each of the four rows, then this part of the character is "-brightened-up," because obviously this is a case of a character of solid, heavy print. Information conversion is carried out so that the black points are converted into dark-gray ones, dark-gray points are converted into light-gray ones, and light-gray points are converted into white ones.

2. "Darkening" -- In cases where a character, in at least three of four neighboring rows, comprises no black point, but only light- or dark-gray points, then this part of the character is to be "darkened," because this is a case of a character of poor print. Information conversion is effected by dark-gray points being converted into black ones and light-gray points remaining unchanged.

3. "Spot Removal" -- In cases where light-gray, dark-gray or black is stored in one surface or area element, and where white is stored in all other neighboring surface elements, the reference surface element is to be converted into white. By the term "one surface element," it is to be understood as a surface which is common to one column and two rows.

The arrangements for effecting the three possibilities of electrical conversion of the shape elements is shown in FIGS. 5 to 8, it being assumed that the three registers 4, 23 and 5 have five columns each.

Figure 5:
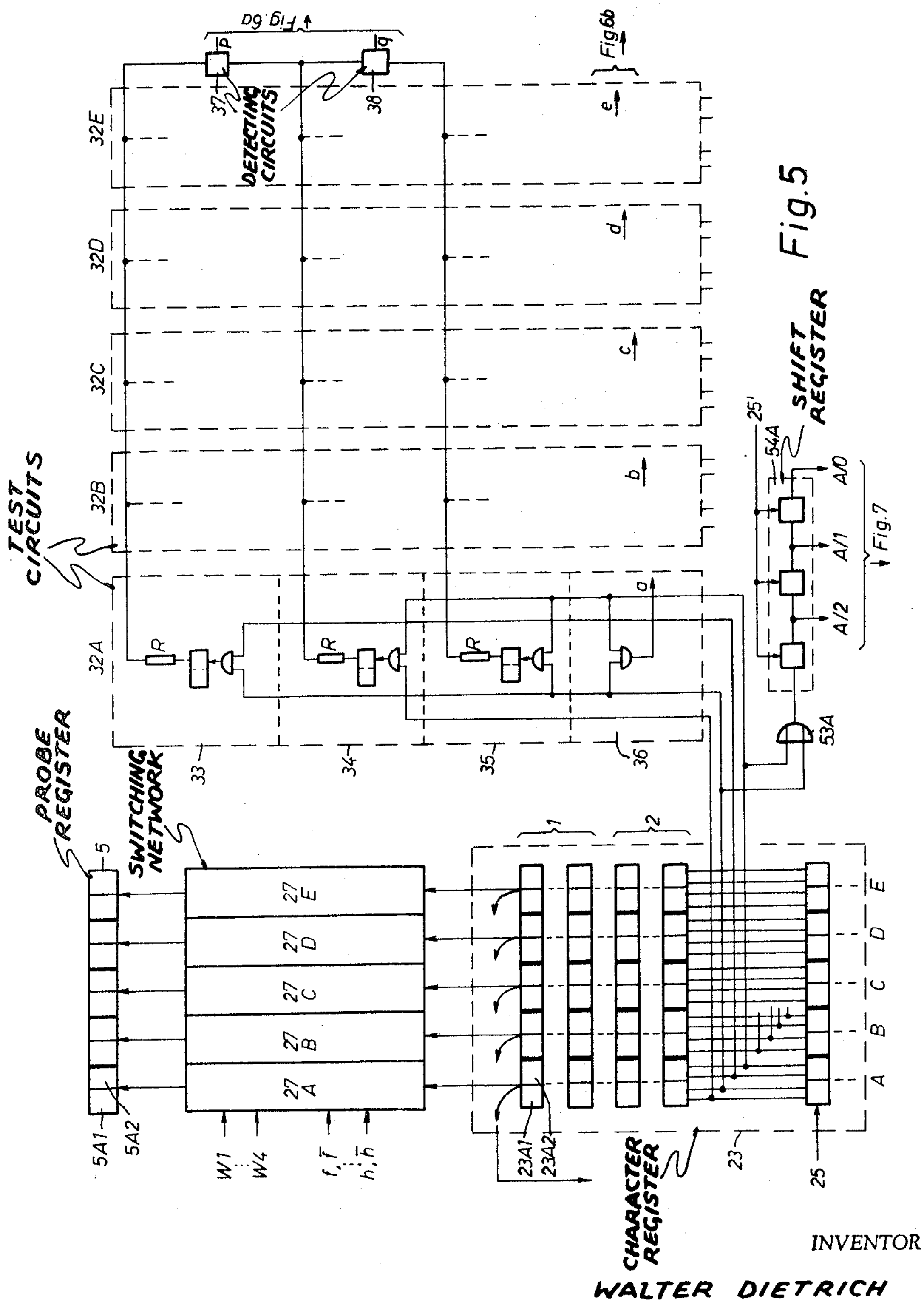
FIG. 5 shows in block diagram an arrangement of electrically modifying the information and the parts of the test circuits for effecting the information conversion.
Figure 6A:
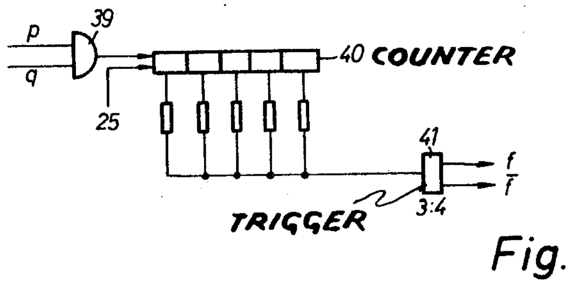
FIGS. 6 and 7 show the remaining parts of the test circuits for effecting the information conversion.
Figure 6B:
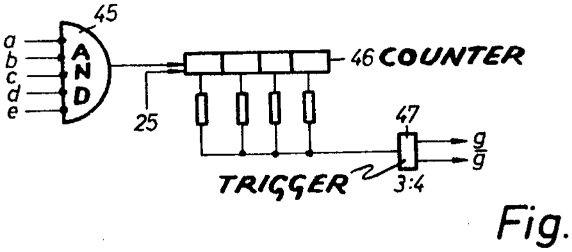
Figure 7A:
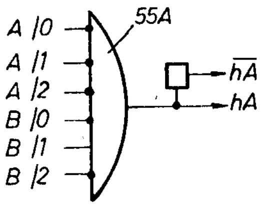

In order to test whether a conversion of information is necessary, there are provided the test circuits shown in the right-hand portion of FIG. 5, and those shown in FIG. 6*a*, 6*b* and 7. For effecting the actual conversion of information there is provided per column one switching network 27*a* to 27*e*, of which one is shown in FIG. 8. On the left-hand side and below in in FIG. 5 and above the probe register 5 there is arranged the character register 23. The test circuits are connected to the lines connecting the outputs of the flip-flops of the fifth row to the inputs of the flip-flops of the fourth row of the character register 23. It will now be recalled that, according to the cross-reference, the four gray stages are encoded as follows:

| | FF 1 | FF 2 |
|---|---|---|
| s | 01 | 01 |
| dgr | 10 | 01 |
| hgr | 01 | 10 |
| w | 10 | 10 |

According to the first possibility, the information is to be brightened. For detecting whether this is necessary in column A, there is provided a test circuit 32A; with respect to columns B...E there are provided identical test circuits 32 B...32 E. This test circuit 32A, with the aid of a circuit portion 33, serves to detect what points are "light-gray," and with portion 34 what points are "dark-gray," and with portion 35 what points are "black." The summation of current, across resistors R, and with the aid of two extreme value detecting circuits 37 and 38 whose output leads are designated p and q, and following an AND-circuit 39 (FIG. 6*a*) leads to the statement: $N\,s > N\,dgr \geq N\,hgr$, wherein N is the number of storage points in one row. This statement, as mentioned hereinbefore, is ascertained row by row, and retained in a counter 40. A connected trigger 41 is so adjusted as to transmit an output signal f as long as at least three of the counter stages are in position "1," thus indicating that the information is to be brightened.

Conversion of information regarding column A is accomplished in the switching network 27 A (FIG. 8) and, simultaneously, with the same signal f in the other columns B...E. In the top part of FIG. 8 there are shown the two flip-flops 5A1 and 5A2 of the first column of the probe register 5, and below there are shown the two flip-flops 23 A1 and 23 A2 of the first column in the top row of the character register 23.

The flip-flops 23 A1 and 23 A2 are followed by a logic network 28 consisting of AND-circuits, which converts the four-digit binary code at the output of the flip-flop, into a one-out-of-four code, corresponding to the four gray stages: white (*w*), light-gray (*hgr*), dark-gray (*dgr*) and black (*s*). In a logic network 32 consisting of OR-circuits, this code is again reconverted into the four-digit binary code.

In the presence of a signal W 2 which will be explained hereinafter, the signal f is capable, via an AND-circuit 42 and in a logic network 43, to convert the information $s \rightarrow dgr$, $dgr \rightarrow hgr$, $hgr \rightarrow w$, and to $w \rightarrow w$, forward it via the logic network 33 to the probe register. In cases where the test circuit does not provide a signal $f$, but the signal $\bar{f}$, information is passed on directly, and instead of the AND-circuit 42, the AND-circuit 44 becomes effective.

The output of circuit 44 is connected to an OR-circuit 30. By the output signal of this circuit, the AND-circuits of one logic network 31 are rendered conductive. In this way the information of column A is forwarded unchanged from the shift register 23 into the probe register 5.

When making use of the second possibility, the information is to be darkened. It is determined by the test circuit 32 A (FIG. 5) whether or not the information is to be darkened. By a circuit portion 36 is connection with an AND-circuit 45 (FIG. 6b) it is checked as to whether no point in the row under consideration, is black. Row by row statements are retained in a counter 46, and an output signal is transmitted by a connected trigger 47, if at least three of the four stages of the counter ter are in position "1." This means that the information is to be darkened. In this case there is produced the signal g, and with the aid of the arrangement according to FIG. 8, in the presence of a signal W3, via an AND-circuit 50 as well as a logic network 51 and the OR-circuits 32, the information $dgr \rightarrow s$, $hgr \rightarrow hgr$, $w \rightarrow **w$, is changed in accordance with the specification concerning the darkening process. If, in the row under consideration, however, there exists a black-information, then the signal $\bar{g}$ is produced, thus causing the logic network 31, via the AND-circuit 52 and the OR-circuit 30, to be rendered conductive, and no darkening is performed.

The two test processes as described hereinbefore, may be performed simultaneously, because the two conversions exclude each other, hence both processes can never occur simultaneously, because s = O excludes the condition $N_s > N_{dgr}$.

Since this checking is being carried out in each row, it is possible for either the one or the other - or none - of the just described two processes to become effective from row to row. This is of importance as well as of advantage, because a great amount of the information to be recognized, is supplied by high-speed printers, and these printers have the peculiarity to print out, even though the print on the whole is rather heavy, individual portions of the characters, e.g., the upper or the lower portion, to show a substantially poorer print, so that it might become necessary to "darken" e.g., the upper portion of the character, and to "brighten up" e.g., the lower portion of the character.

In certain kinds of high-speed printers, the characters are not printed above or below, but on the left or on the right with a very different degree of density or blackness. In this case, the above-described checking of the rows can have the wrong effect, and it is intended to take such properties of peculiarities of the printing mechanisms into consideration. Therefore, it is advisable not to perform the checking extending over three to four entire rows, but to subdivide the character area also in the vertical direction, hence to divide the area into a surface area including the columns A to C and rows 1 to 6, and into a surface area including columns C to E and rows 1 to 6.

With the aid of the third possibility it is intended to remove spots. By the OR-circuit 53A (FIG. 5) it is determined whether non-white information is contained in column A. If it is, the first stage of the three-stage shift register 54 A is marked, and this information is shifted with a pulse 25′ through the register 54A. The pulse 25′ has half the frequency of pulse 25 which is intended to shift the character information through the character register 23. This is favorable, because in view of the relatively high row-by-row resolution, since a spot covering one column and two rows, is removed provided that its surroundings are white. The checking as to whether a spot exists in column A and, at the same time, its surroundings are white, is effected in an AND-circuit 55 A (FIG. 7a). This circuit produces an output signal $h$, A in cases where a non-white information is found to be on line A/1, in column A and the group of rows 1, including the first two rows of the character register 23 which are ready for being transferred to the switching network 27 A, and previously in the same column A. The group of rows O which has already been forwarded, indicated by the signal A/O, and subsequently thereto, in the group of rows 2 which is forwarded after the group of rows 1, indicated by the signal A/2, is found to be white just as in column B of the groups of rows 0, 1 and 2. In FIG. 8, in the presence of a signal W4, the signal $h$ is combined therewith in an AND-circuit 56 whose output line serves to set the flip-flops 5 A1 and 5 A2 of the probe register 5 to "white" via the OR-circuit 32.

In cases where the spot-removal condition is not met, both the OR-circuit 30 and the logic network 31, by means of the inverted signal $\overline{h\ A}$, via an AND-circuit 57, is switched to become conductive, and the information contained in the row of column A under consideration, is forwarded without being subjected to a conversion.

Figure 7B:
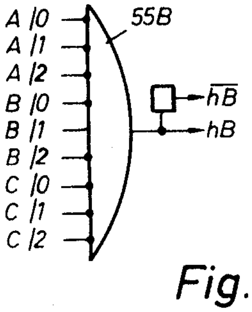
Figure 7C:
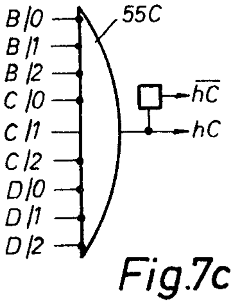
Figure 7D:
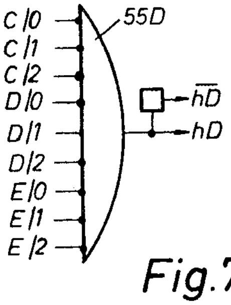
Figure 7E:
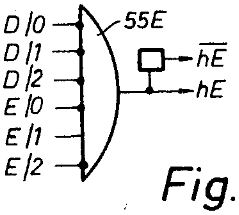
Figure 8:
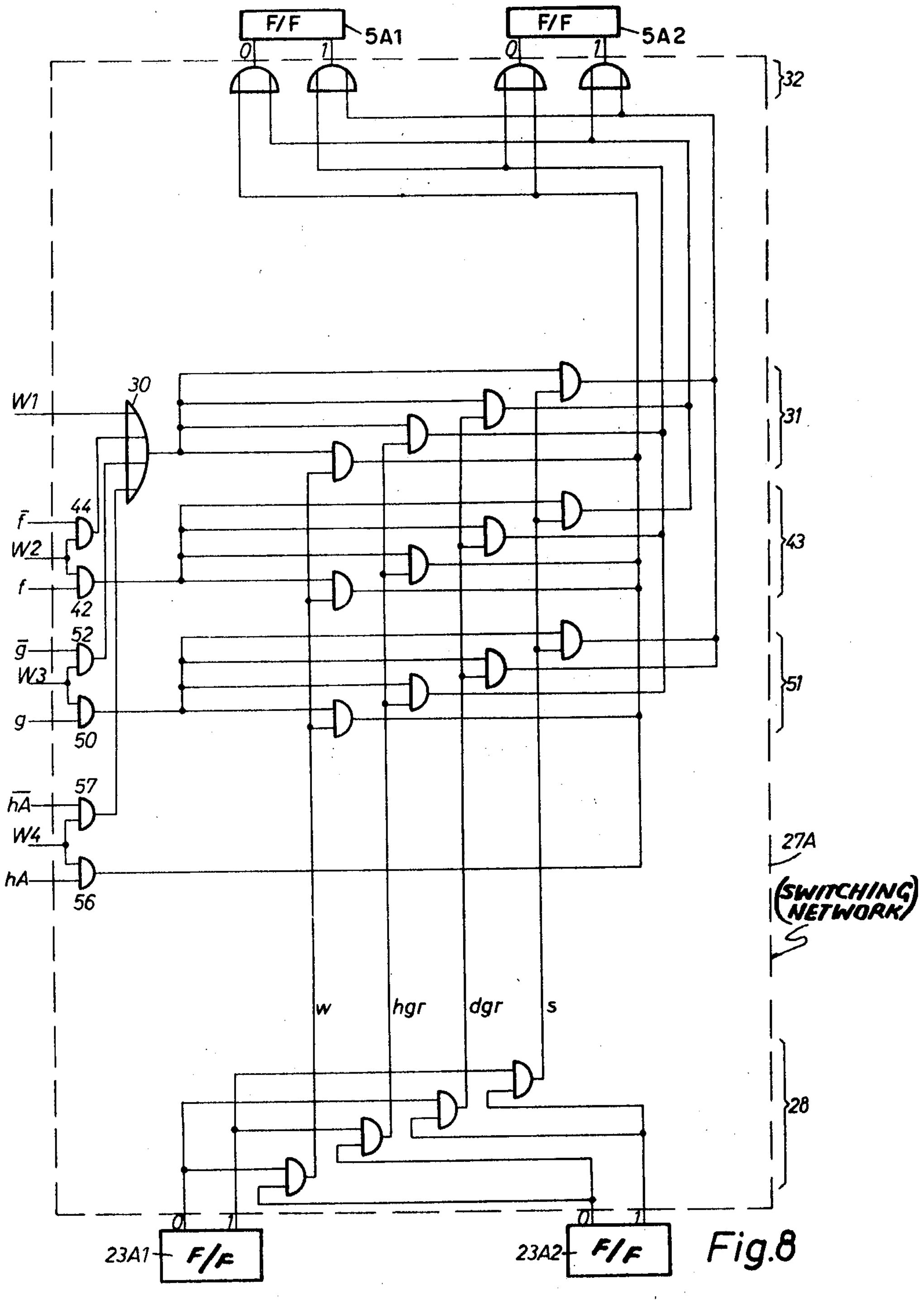
FIG. 8 shows the information (data) converter circuit.

FIG. 7*a* shows the AND-circuit 55 A for supervising or surveying the column A with respect to spots, and as regards the other columns the corresponding AND-circuits 55 B....55 E are shown in FIGS. 7*b*...7*e* in respect to columns B....E.

Prior to recognition, it cannot be determined whether a change of information, brightening up, darkening, or spot removal, is necessary, or whether no change of information is necessary. Therefore, it is of advantage to switch on the individual changing possibilities successively.

In a further embodiment of the invention, there is provided the possibility of carrying out more than two recognition processes successively and independently of one another, and of evaluating thereafter all the results for effecting the final recognition.

With respect to the aforementioned four cases, a sequence control will now be explained with reference to FIG. 12. In this case the counters 9′, corresponding to the counters 9 in FIG. 1, are designed for a maximum numerical value of 96, that is the highest number of pulses which is likely to occur when evaluating the characters four times. The character information is permitted, in the described manner, to rotate four times in the character register 23, and a centering pulse 49, which is required in each case, is utilized for switching on successively the changing possibilities with the aid of a counter 48 which, in the present example, consists of four stages. The centering pulse 49 can be obtained, for example, by five stages of the top row of the character register 23 being combined with a not shown OR-circuit; this OR-circuit each time provides the signal 49 when the character reaches the top row of the character register. At the end of the third recognition process, restoring of the character information into the character register is suppressed by interrupting the return lead.

Immediately after the end of the fourth recognition process, and controlled by the last stage of the counter 48, the extreme value detecting circuit is put into operation via a line 61. The counter, in its four positions, successively provides the signals W1 to W4 which, if the corresponding signals $f$, $g$ and $h$ exist, effect in a row-by-row manner, the conversion of information (FIG. 8). In the case of the signal W1 the information is always forwarded without being changed. In the counters 9′ there is effected a summing up of the results of the individual recognition processes.

This process of multiple evaluation, is favored from a cost point of view and from a functional point of view in cases where slight conversions of the information are involved. In cases of a more extensive conversion of the information, however, the process may lead to ambiguous or uncertain results, with the added disadvantage that this ambiguity is not indicated by the machine, but there is indicated a completely unambiguous result. This will now be explained with reference to an extreme example relating to the following three recognition processes:

| | | character | |
|---|---|---|---|
| | | Z1 | Z2 |
| 1. | recognition process | 19 | 18 |
| 2. | recognition process | 20 | 19 |
| 3. | recognition process | 20 | 24 |
| | total counter reading | 59 | 61 |

Accordingly, in this case and after the three recognition processes, there is unambiguously recognized the character Z2 although, in two out of the three cases, the character Z1 has been recognized owing to its higher individual counting value.

Figure 13:
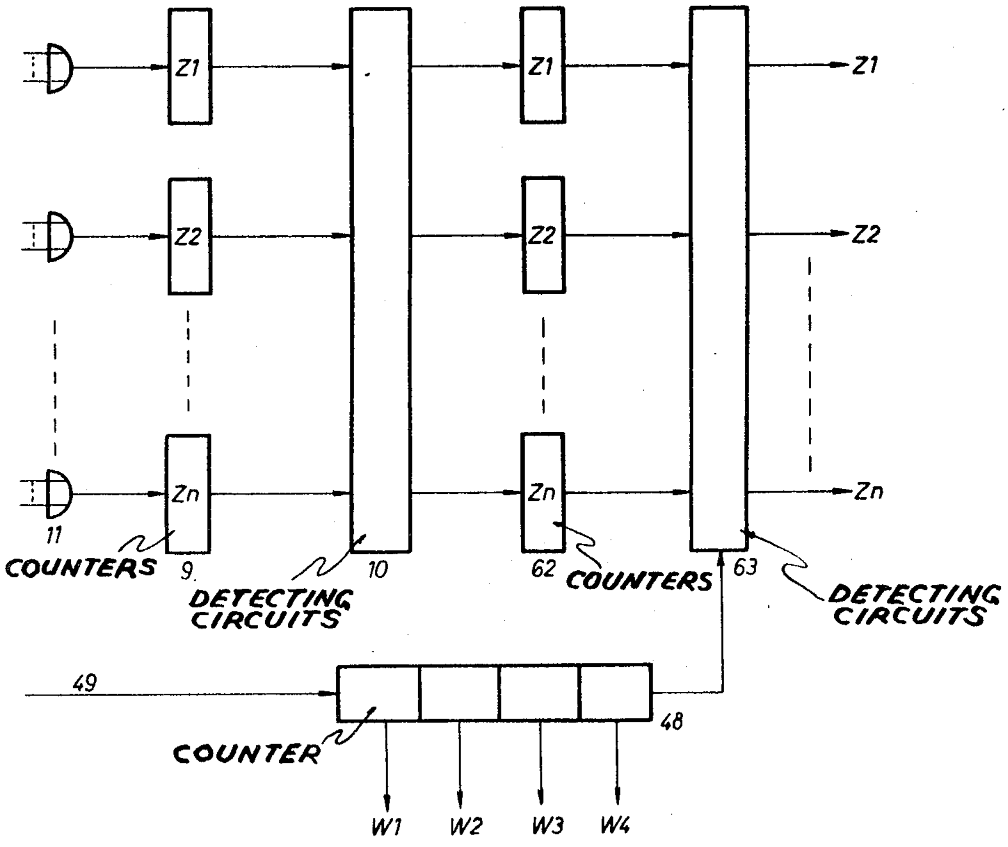

In a further embodiment of the arrangement, the individual results are retained and evaluated separately, as is shown in FIG. 13.

The counters 9 now again consist of 24 stages as in FIG. 1. The extreme value detecting circuit 10 is now followed by small counters 62 which only need to contain as many stages as evaluations are intended, hence four in the present example. The performance of the computing processes is again controlled by the counter 48 which, thereupon, releases a third extreme value detecting circuit 63 for detecting one of the counters 62, the one with the highest individual counting value, and for indicating the character assigned thereto, as the one which has been recognized. In the example shown in the foregoing table, this process indicates the character Z1 as the one being recognized.

Figure 12:
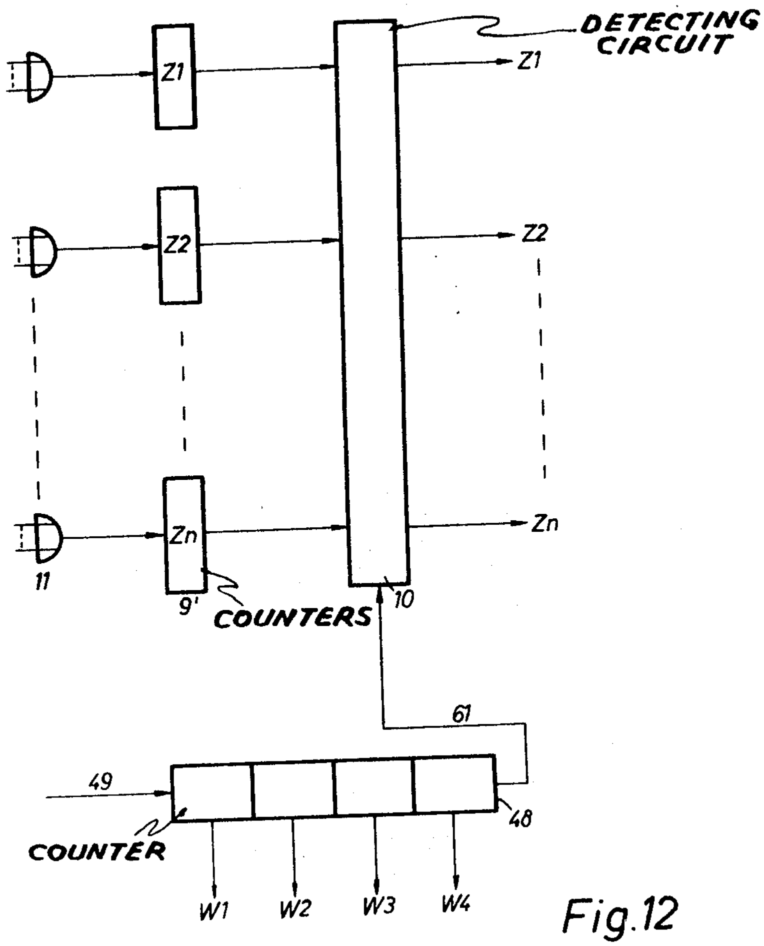
FIGS. 12 and 13 show the combination and evaluation of the results of several recognitions.

In the numerical example given above, the two processes according to FIGS. 12 and 13 provide different results. In order to obtain unambiguous results, and in order to indicate in this case the ambiguity properly, it is proposed, in accordance with a further embodiment of the arrangement, to carry out both processes in parallel, and to print out a character as being correctly recognized only if both processes provide the same result.

For implementing this parallel operation, the counters 9′ of FIG. 12, and the counters 9 of FIG. 13 can be selected in common via the outputs of the OR-circuits 11 and the outputs Z1 to Zn of FIG. 12 and the identically designated ones of FIG. 13 can be combined respectively by one AND-circuit.

Thus, it is possible for the counter 48 not to be stepped on routinely by the centering pulse 49, but only as long as a non-recognized signal has resulted from the recognition process. A non-recognized signal is derived in a known manner from the output signals Z1 to Zn if either no counter has reached a certain minimum value - e.g., half the maximum value - , or if two or more counters provide an identical or only slightly differing indication.

Figure 12A:
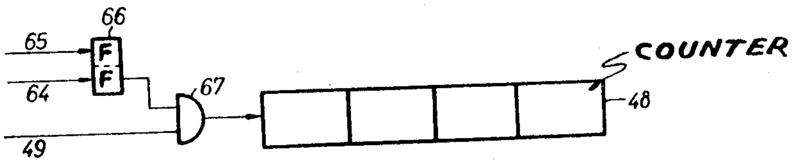

Both conditions are indicative of an unreliable recognition. Controlling with the aid of the non-recognized signal, designated by 64, and is shown in FIG. 12*a*. The counter 48 is now no longer stepped on alone by the centering pulse 49, but prior thereto, the non-recognized signal 74 must have a flip-flop 66. In cases where a character has been recognized, the flip-flop 66 is reset by a recognized-signal 65, and one AND-circuit 67 is blocked.

It should be pointed out that the arrangements relating to the processes according to FIGS. 12 and 13 can be simplified in a known manner by employing the conventional control circuits for effecting temporal sequences. For example, to provide in FIG. 13 only one extreme value detecting circuit, and to connect this circuit, via logic circuits, successively to the different groups of counters.

In the previous described embodiments of the invention, in particular, in the case of the above-mentioned processes, the recognition processes were carried out successively. In cases where the reading speed is to be maintained, it should be recognized that there are certain restrictions with respect to increasing the clock pulse frequency 25, which is necessary in the case of several of the recognition processes, due to the waiting time of the signals at the probes. For this reason there is proposed a further arrangement with the aid of which this difficulty can be overcome and several recognition processes can be performed simultaneously.

This arrangement will now be described with reference to FIG. 4, there is shown the shift register 4, the character register 23, and the probe register 5. All three of these registers now have six columns lying next to each other. Relative thereto, it will be recalled that the probe registers as shown in FIGS. 2 and 3 only contain five columns each. With the aid of the arrangement according to FIG. 4, two recognition processes are carried out in parallel, that is, from the character register which has been enlarged owing to the poor printing quality of the characters, and from two areas overlapping each other, there is derived the information corresponding to the actual character with - five columns in the present example - , The information relating to both areas is further processed in separate recognition circuits.

Figure 9:
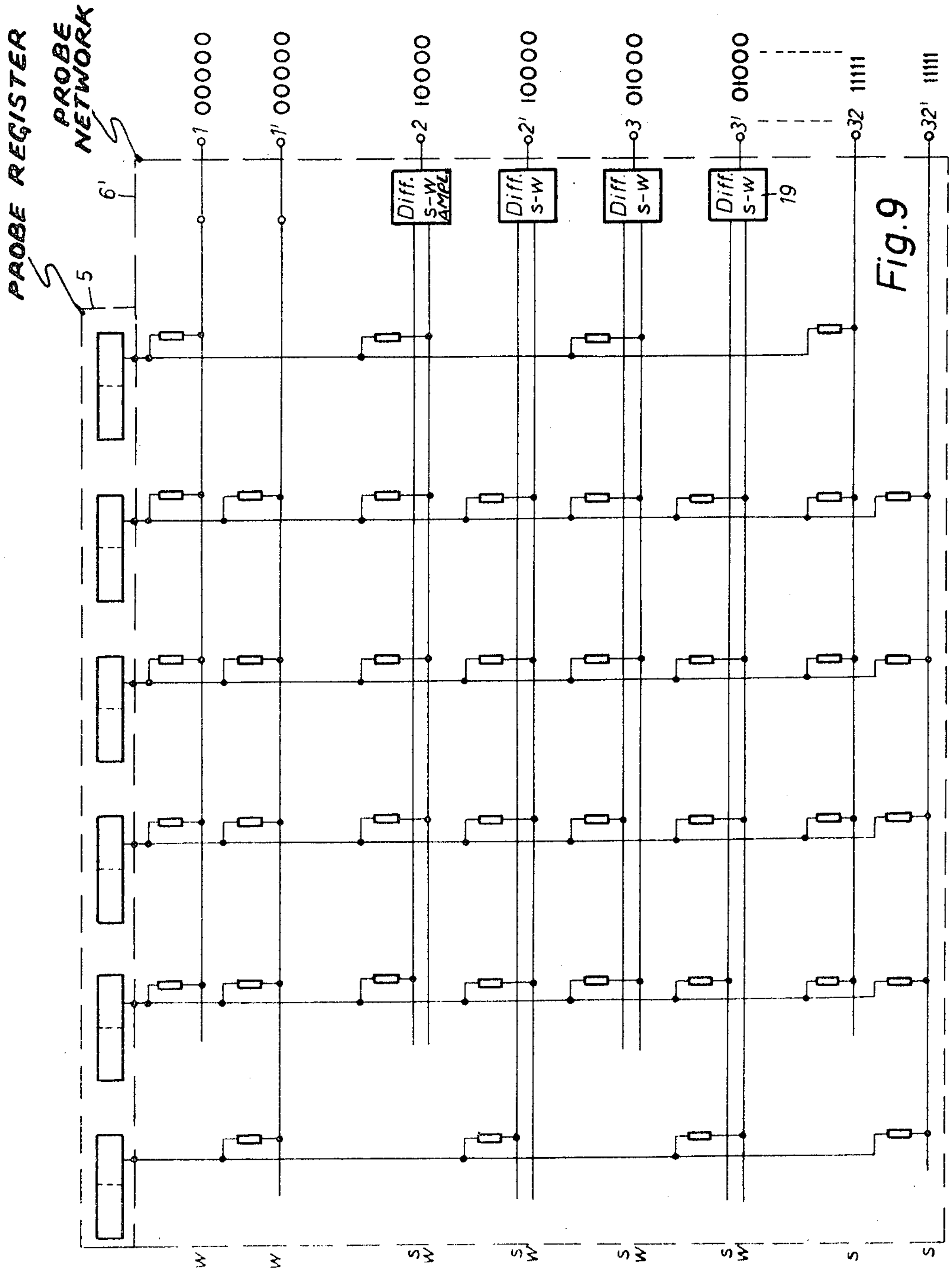
FIG. 9 shows the probe network for the arrangement according to FIG. 4.

FIG. 9 shows how the probes of the probe network 6′ are connected to the probe register 5. The probe network 6′ is designed similar to the probe network 6 in the cross-reference.

In this case each row (probe) comprises two lines, namely one black (*s*) and one white (*w*) line; the output of the corresponding stage of the probe register is connected to the w-line in cases where the associated raster field and, consequently, the probe element is white, and to the *s*-line in cases where this element is found to be black. The pairs of lines are each connected to one differential amplifier 19, so that for each probe it is possible to form the difference between black and white. In FIG. 9 this probe network is doubled, with one portion of the column leads being provided in common for both probe networks, so that the columns 2 to 6 form the one part, and the columns 1 to 5 form the other part of the probe network. The probe network has double the number of outputs, i.e., 1 to 32 for the one part, and 1′ to 32′ for the other part of the probe network.

Further details of this recognition process will result from the modification according to FIG. 1. The extreme value detecting circuit 7 now requires double as many inputs and outputs as in FIG. 1. With respect to the following actual recognition circuits, those which look differently with respect to each of the characters, there will result the alternatives according to FIGS. 10*a* and 10*b*.

Figures 10A, 10B:
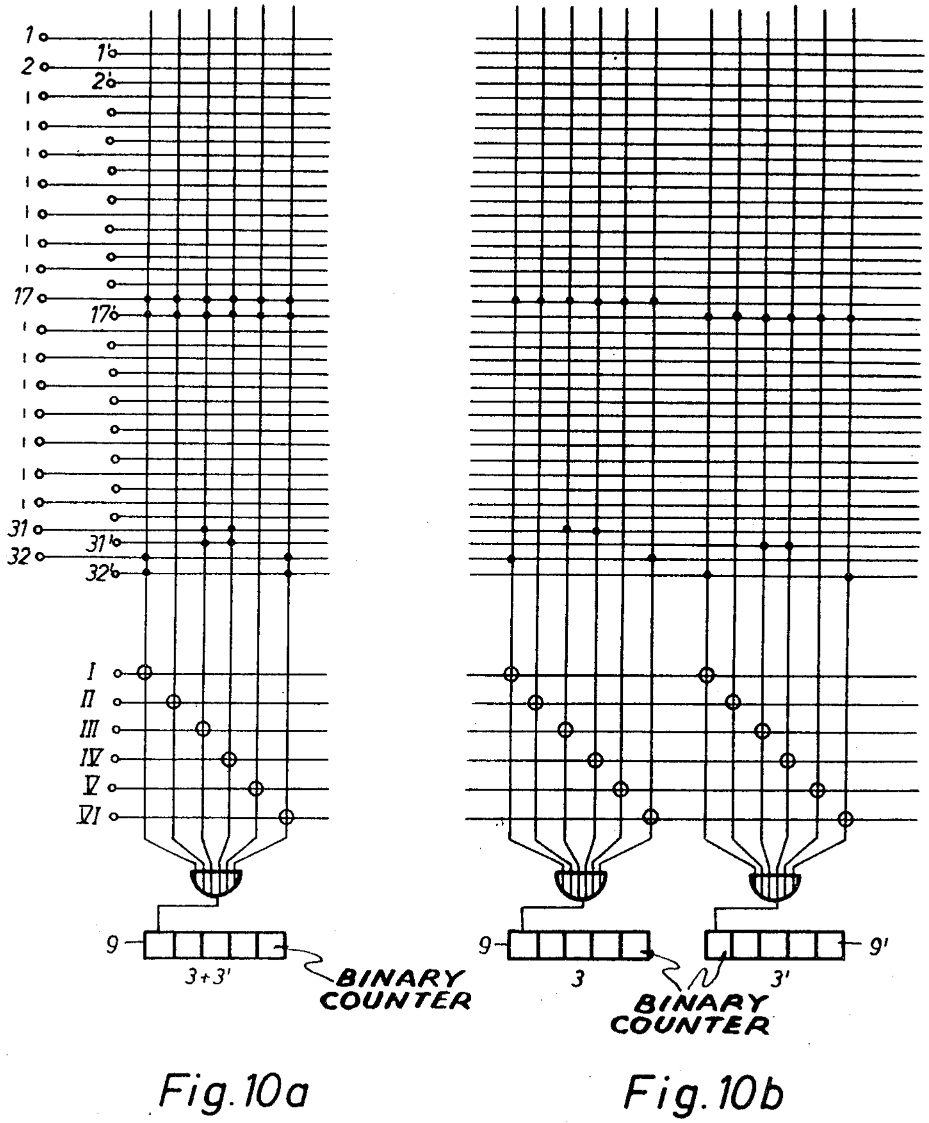
FIGS. 10*a*, 10*b* show two alternatives of the recognition circuits shown in FIG. 9.

In FIG. 10*a* the statements of the two groups of probes are combined in a zonewise manner by means of OR-circuits as in the cross-reference, and are led to one common binary counter 9. This type of embodiment, when compared with that of FIG. 10*b*, is more economical, but softer, it will result in a smaller number of rejections in the case of a poor printing quality of the characters, but in a greater number of substitution errors.

In the arrangement according to FIG. 10*b* the two groups of probes are separately led to one binary counter 9 or 9′ for the same character respectively; and each counter is separately led to the input of the extreme value detecting circuit 10 (FIG. 1) which, in turn, also contains double the number of inputs and outputs corresponding to the different characters contained in the set of characters. Only at the output of the extreme value detecting circuit 10, the two outputs 3 and 3′ are combined via an OR-circuit which is not shown in FIG. 1, and are led to the output serving figure "3." This process performs the checking in a "harder" way which, illustratively, may also be recognized from the fact that in this case one of the two binary counters alone, without the cooperation of the other group of probes, must reach the highest number before the character is indicated as having been recognized.

As to the two groups of probes shown in FIG. 9, it should be noted that the probes may also be combined partially, this is particularly obvious from the probes 1 and 1′; and it should be noted that a possible modification is with one or more resistors missing which may be appropriate in cases where one portion of the character, in the case of nominal values, would just cover one half each of two horizontally adjacent points.

There will now be described a feature which is common to both arrangements, and which is considered as being adding to all of the formerly mentioned types of embodiments of the invention, and to conventional processes. According to this feature, subsequently to the recognition of one shape element, there is stored the number of occurrences of this particular shape element within one character, and the contrast of the subsequently following identical shape elements is varied in dependence upon this number of occurrences. This arrangement has a particular effect upon the vertical and horizontal dashes or striae of a character. Variation of the contrast is effected so that irregularities as regards the structure, i.e., holes within the vertical dashes or striae, are covered and fringes in the case of horizontal dashes or striae are suppressed.

Figure 11:
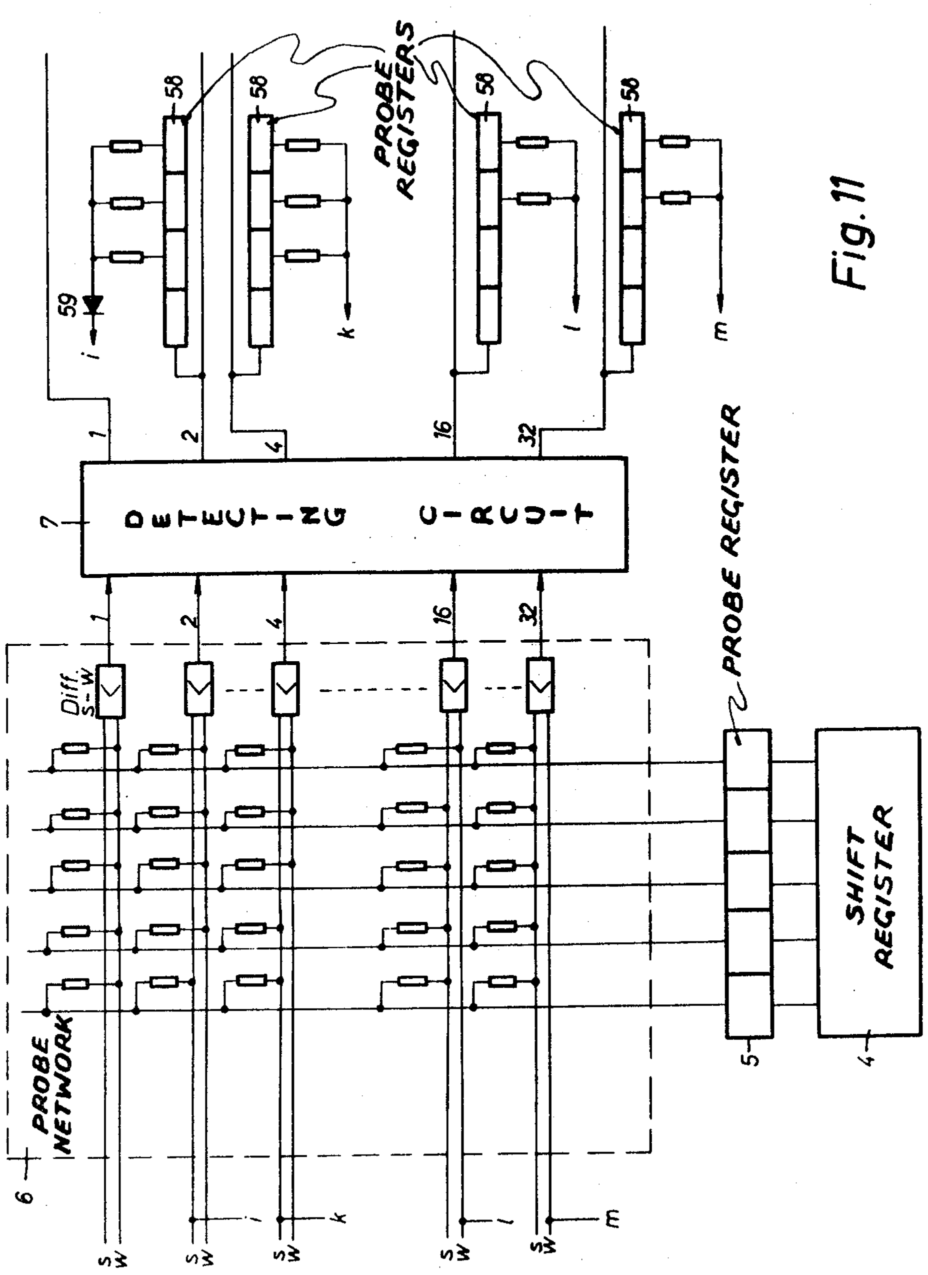
FIG. 11 shows the arrangement for effecting the change of contrast.

A block diagram relating to this feature is shown in FIG. 11. There are again shown the shift register 4, the probe register 5, the probe network 6, and the extreme value detecting circuit 7. In the example, there are provided at the output of the extreme value detecting circuit 7, for the probes 2 (10,000), 4 (11,000), 16 (11,110) and 32 (11,111), small shift registers 58 with four stages each which, across the summation resistors, serve to supply the feedback voltages on lines *i* to *m*.

The voltages as appearing on lines i and k act upon the *s*-lines of the probes 2 and 4, thus increasing the black-proportion in these probes, i.e., up to a certain limit the stronger the more frequently the respective shape element has occurred. Amplification only commences when the shape element has occurred twice, and no longer increases after it has occurred four times. The voltages as appearing on lines l and m act in a similar way upon the *w*-lines of the probes 16 and 32, so that there is increased the white-proportion in these probes.

As should be understood from FIG. 11, changing of the contrast in the case of the horizontal shape elements only becomes effective after three identical shape elements. This step carries out the change of contrast only in response to particular electrical information of the character which, at least by one width of striae or dash (e.g. 0.25 mm.) is apart from the measured black-distribution.

It is also possible to provide diodes 59 (of which only one is shown in the branch of probe 2), which are intended not to impair the current distribution within the probe resistors, or to influence the voltage at the nodal point in the wrong direction, as long as no information is stored in the shift register 58, because the character has only just started. The diode 59 is blocked as long as no feedback voltages are supplied by the register 58.

Although I have described above the principles of my invention in connection with specific apparatus, it is to be clearly understood that this description is made only by way of example and not as a limitation to the scope of the invention as set forth in the objects thereof and in the accompanying claims.

What is claimed is:

1. An arrangement for automatic character recognition in which the characters are broken up into their characteristic shape elements, comprising:
   - means for scanning and electrically storing the shape elements;
   - a probe network coupled to receive the shape elements;
   - means for detecting a probe most similar to a particular shape element, including a first extreme value detecting circuit;
   - means for assigning the probe thus detected to the relevant character on the basis of its location in the character area, so that for each character the number of probes assigned thereto is stored;
   - means for determining the character with the largest number of assigned shape elements including a second extreme value detecting circuit;
   - an intermediate storage coupled to receive the scanned and electrically stored shape elements so that several recognition processes are carried out successively;
   - means for restoring the shape elements, simultaneously with the recognition process, in an unchanged fashion in the intermediate store, so that during each recognition process different shape elements are offered to the probe network; and
   - means depending on the number of occurrences one shape element is stored to effect a change of contrast of the subsequently following identical shape elements.

2. An arrangement according to claim 1 including means for staggering the shape elements coupled to said probe from said intermediate storage during two recognition processes, such that the first recognition process is interrupted when this first process provides an unambiguous result.

3. The arrangement of claim 1 including means for electrically changing said shape elements during further recognition processes.

4. The arrangement according to claim 3 including means for multi-stage digital coding of the density or blackness, and means for brightening one shape element when the major portion of several adjoining shape elements have a higher degree of blackness than the next lower degree of blackness, said brightening means being effected so that the existing degree of blackness is adjusted in a spot-wise manner to the next lower degree of blackness.

5. The arrangement according to claim 3 including means for darkening a shape element whenever, in the major portion of several adjoining shape elements, the major blackness per shape element does not appear, the darkening being effected so that points with the second highest blackness degree are adjusted to the highest degree of blackness.

6. The arrangement according to claim 5 wherein the character field is subdivided in the vertical direction, and the darkening is carried out separately in each part of the character.

7. A process according to claim 3 including means for changing into white several non-white spots which are linked together and lying within one column whenever the surroundings are white.

8. The arrangement according to claim 3 including means for storing and comparing the results of the recognition processes with one another, and means for indicating one character as having been recognized when the major portions of several recognition processes are in agreement, and means for interrupting said process as soon as an unambiguous result is obtained by the first recognition process.

9. The arrangement according to claim 8 including means for summing the results of several of said recognition processes in counters arranged to precede said second extreme value detecting circuit.

10. The arrangement according to claim 8 including means for storing the results of several recognition processes in counters coupled to said second extreme value detecting circuit.

11. An arrangement of automatic character recognition in which the characters are broken up into their characteristic shape elements, comprising:
   - means for scanning and electrically storing the shape elements;
   - a probe network coupled to receive the shape elements;
   - means for detecting a probe most similar to a particular shape element, including a first extreme value detecting circuit;
   - means for assigning the probe thus detected to the relevant character on the basis of its location in the character area, so that for each character the number of probes assigned thereto is stored;
   - means for determining the character with the largest number of assigned shape elements including a second extreme value detecting circuit;
   - an intermediate storage coupled to receive the scanned and electrically stored shape elements, the store areas for the shape elements and the probe area are greater than the character area, so that simultaneous evaluation is carried out in two overlapping probe areas which are the same size as the character area; and
   - means depending on the number of occurrences a shape element is stored to change the contrast of the subsequent identical shape elements.

12. An arrangement according to claim 11 including means for evaluating output signals relating to said two probe areas in common in a zone-wise manner (zone-by-zone).

13. An arrangement according to claim 11 including means for evaluating output signals of said two probe areas separately, and means for separately feeding said signals to said second extreme value detecting circuit and for combining at the output thereof.

14. The arrangement according to claim 13 wherein said means to change the contrast becomes effective when the particular electrical information of the character is apart from the measured black distribution at least by one width of a striae or dash.

15. The arrangement according to claim 14 wherein the means to change the contrast emphasizes the vertical elements of the striae or dashes when a voltage value corresponding to the stored value is increased, and the horizontal elements of striae or dashes are emphasized when the voltage is reduced.

* * * * *